(12) United States Patent
Sasse et al.

(10) Patent No.: US 6,226,985 B1
(45) Date of Patent: May 8, 2001

(54) IMPELLER WHEEL ARRANGEMENT AND TURBINE WHEEL ARRANGEMENT FOR A HYDRODYNAMIC TORQUE CONVERTER

(75) Inventors: Christoph Sasse; Hans-Wilhelm Wienholt, both of Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/410,722

(22) Filed: Oct. 1, 1999

(30) Foreign Application Priority Data

Oct. 5, 1998 (DE) .............................................. 198 45 691

(51) Int. Cl.[7] .................................................. F16D 33/00
(52) U.S. Cl. ............................................... 60/365; 60/367
(58) Field of Search ............................ 60/330, 365, 366, 60/367; 416/180, 197 C

(56) References Cited

U.S. PATENT DOCUMENTS

| 5,522,220 | 6/1996 | Locker | .................................. 60/361 |
| 5,836,157 | * 11/1998 | Kosuge | .................................. 60/362 |

FOREIGN PATENT DOCUMENTS

| 0 846 893 | 12/1997 | (EP) | .............................. F16H/41/26 |
| 0 846 894 | 12/1997 | (EP) | .............................. F16H/41/26 |
| 363169 | 1/1931 | (GB) . | |

* cited by examiner

Primary Examiner—Edward K. Look
Assistant Examiner—Michael Leslie
(74) Attorney, Agent, or Firm—Cohen, Pontani, Lieberman & Pavane

(57) ABSTRACT

A turbine wheel arrangement for a hydrodynamic torque converter comprises an outer shell connected with a turbine wheel hub for common rotation and a plurality of blades arranged successively along the circumferential direction at the outer shell. A side of the blades remote from the outer shell is connected to an inner shell so that fluid flow channels are formed between adjacent ones of the blades together with the outer shell and the inner shell. At least one of the blades has an outer blade area lying closer to the outer shell that has a blade contour adapted to a first operating state, especially a starting operation, of a torque converter and an inner blade area lying closer to the inner shell that has a blade contour adapted to a second operating state, especially a driving state, of the torque converter.

20 Claims, 3 Drawing Sheets

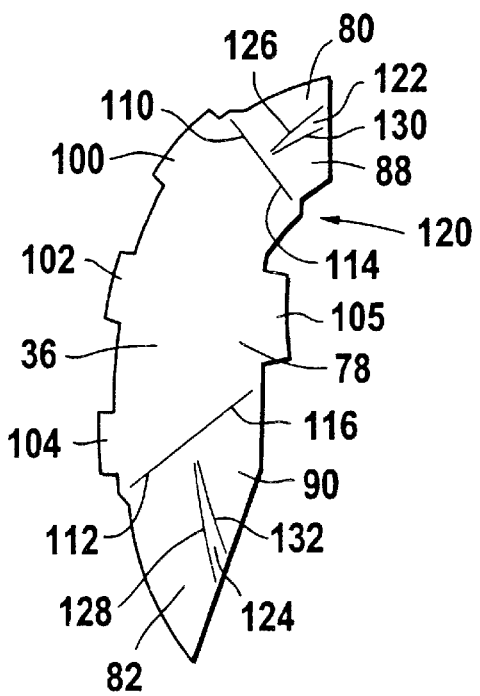
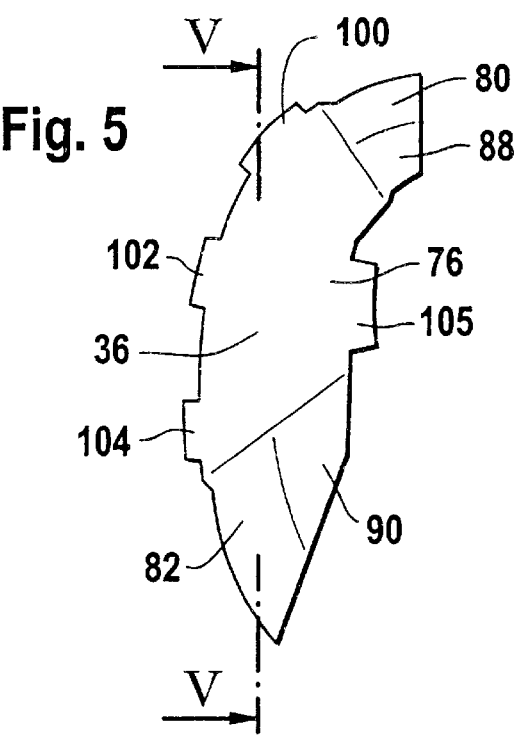
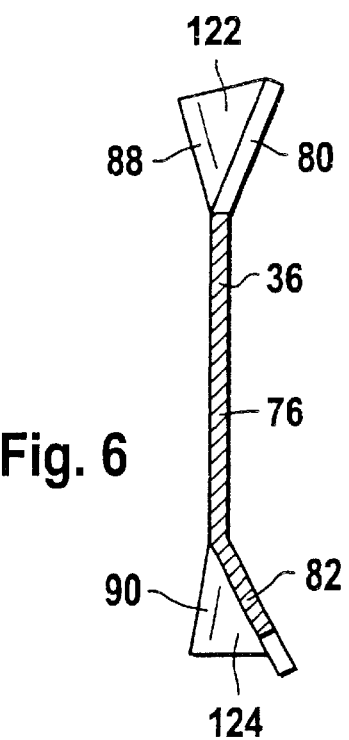

US 6,226,985 B1

IMPELLER WHEEL ARRANGEMENT AND TURBINE WHEEL ARRANGEMENT FOR A HYDRODYNAMIC TORQUE CONVERTER

BACKGROUND OF THE INVENTION

1. Field of the Invention

The present invention is directed to a turbine wheel arrangement and an impeller wheel arrangement for a hydrodynamic torque converter comprising an outer shell connected with a respective hub for common rotation and a plurality of vanes or blades arranged successively in the circumferential direction at the outer shell. The blades are connected to an inner shell at a side of the blades remote from the outer shell. Fluid flow channels are formed between the successive of blades and in the outer shell and inner shell.

2. Description of the Related Art

Prior art impeller wheel arrangements and turbine wheel arrangements having blades arranged successively along a circumferential direction are used in known torque converters and have the problem that the blade configuration, i.e., the contouring of the blades must be adapted to different operating ranges or operating points of a torque converter to provide the respective fluid flow channels to provide operating characteristics that are acceptable over a relatively large operating range and a good torque transmission and so that the torque converter has a relatively high efficiency. For example, at the starting operating point of a vehicle a high staring conversion is required in which the turbine wheel arrangement essentially does not rotate and initially only the impeller wheel arrangement is driven by the driving means, whereas at an operating point of a vehicle where the ratio of the speed of the turbine wheel arrangement to the speed of the impeller wheel arrangement is greater than 0.8 a high efficiency is required. To completely satisfy each of these operating requirements, the blades of the turbine wheel arrangement and/or of the impeller wheel arrangement would have to be constructed with different blade contours. Since only one blade contour is possible in each device, compromises were made in the prior art devices with regard to the blade contouring for different operating points to provide an acceptable converter characteristic for the starting range as well as for the normal or approximately constant driving range. It is obvious that, based on this compromise, no approximately optimum converter characteristic can be provided in any of the relevant driving ranges.

A prior torque converter is disclosed in European Patent EP 0 846 893 A2 in which the respective blades in both turbine and impeller are constructed so as to be completely offset along a direction of flow, i.e., blade portions lying in different areas in the circumferential direction are provided. An arrangement of this type is intended to prevent separation of flow in modem torque conveners which, owing to a lack of sufficient installation space, are constructed in an axially flat manner. This is achieved by offsetting the two blade portions relative to one another at the translational area between the two blade portions. The translational area is constructed in a stopped manner and extends along the flow direction. However, no additional adapting measures are taken in this torque converter of the prior art in the area of the impeller wheel or turbine wheel which would make them especially suitable for determined operating states or for a greater range of operating states.

SUMMARY OF THE INVENTION

It is the object of the present invention to provide a turbine wheel arrangement or an impeller wheel arrangement for a hydraulic torque converter in which improved working characteristics are achieved in different operating states, especially frequently occurring or critical operating ranges, of a torque converter.

In accordance with the present invention, this object is met by a turbine wheel arrangement and an impeller wheel arrangement for a hydrodynamic torque converter comprising an outer shell connected with a respective hub for common rotation and a plurality of blades ranged in succession in the circumferential direction at the outer shell. The blades are connected with an inner shell at a side of the blades remote of the outer shell. Respective fluid flow channels are formed by blades arranged successively in the circumferential direction together with the outer shell and the inner shell.

At least one of the blades of the turbine wheel or the impeller wheel is further provided with a blade area lying closer to the outer shell that has a blade contour adapted to a first operating state such, for example, as a starting operation state of a torque converter and with a blade area lying closer to the inner shell that has a blade contour adapted to a second operating state such, for example, as a driving operation state of the torque converter.

According to yet a further embodiment of the present invention, it is suggested that at least one of the blades, but preferably all of the blades, of the turbine wheel arrangement and/or of the impeller wheel arrangement are divided into different blade working areas, with each of the different blade working areas being adapted to a different operating state. That is, the different blade working areas have shapes which are optimized for different operating states or operating ranges of a torque converter. Accordingly, for example, an area of the respective blades lying closer to the outer shell may have a contour which is optimized for the torque conversion in the swung state, while the blade area lying closer to the inner shell may be optimized for the normal driving state in which the speed difference between the turbine wheel and the impeller wheel approaches zero, but the torque converter is not bypassed by a lockup clutch generally provided in this torque converter.

According to a further embodiment of the present invention—regardless of whether it is provided for the turbine wheel arrangement or for the impeller wheel arrangement—a preferably substantially flat base area of the blade is provided and, in an end area of the blade following the base area of the blade in the upstream and/or downstream direction, a blade area lying closer to the outer shell is offset in the circumferential direction with respect to a blade area lying closer to the inner shell. As a result of dividing at least one blade into areas effective for different operating states in at least one blade end area, this end area acts differently in the different operating states, but a blade base area constructed for a very large range of operating states is still provided.

In this case, for example, it can be provided that the blade area lying closer to the outer shell and the blade area lying closer to the inner shell are offset relative to one another in the circumferential direction by extending away from the blade base area in different circumferential directions. In particular, it is possible that the blade area lying closer to the outer shell and the blade area lying closer to the inner shell are inclined and/or curved to different degrees in the circumferential direction with respect to the blade base area.

Depending on the torque requirements for which a torque converter is to be designed and on the operating states or ranges for which the different blade areas are to be constructed, it may be provided, for example, that the blade area lying closer to the outer shell and the blade area lying closer to the inner shell extend away from the blade base area in the same circumferential direction, but at a different inclination and/or with a different curvature. Alternatively, the blade area lying closer to the outer shell and the blade area lying close to the inner shell may extend away an&or curve away from the blade base area in opposite circumferential directions.

It is noted in this respect that the above also includes a construction in which the area lying, closer to the outer shell and the area lying closer to the inner shell both extend away from the base area in the same circumferential direction in one blade end area and extend away from one another in opposite circumferential directions in the other blade end area.

To achieve different contours in the respective blade areas, the blade area lying closer to the outer shell and the blade area lying closer to the inner shell may be divided from one another by a notch extending essentially in one flow direction of fluid flowing along the blade, preferably in the area of a central thread of flow.

However, as an alternative, it is also possible that the blade un lying closer to the outer shell and the blade area lying closer to the inner shell are connected with one another by a transitional wall area preferably extending along the central thread of flow.

The two above-described alternatives for achieving the offset position of different blade areas are especially suitable because the blades are generally manufactured from stamped sheet metal parts which can be shaped in a simple manner by bending.

The present invention is further directed to a hydrodynamic torque converter containing a turbine wheel arrangement according to the invention and/or an impeller wheel arrangement according to the invention.

The various features of novelty which characterize the invention are pointed out with particularity in the the claims annexed to and forming a part of the disclosure. For a better understanding of the invention, its operating advantages, and specific objects attained by its use, reference should be had to the drawing and descriptive matter in which are illustrated and described preferred embodiments of the invention.

BRIEF DESCRIPTION OF THE DRAWINGS

In the drawings wherein like reference characters denote similar elements throughout the several views;

FIG. 4 shows a metal blank for an alternative embodiment of a blade of the turbine wheel arrangement according to the invention, FIG. 5 shows a blade for a turbine wheel arrangement according to the invention that is shaped from the metal blade of FIG. 4; and FIG. 6 is a sectional view of the blade of FIG. 5 along a line VI—VI.

DETAILED DESCRIPTION OF THE PRESENTLY PREFERRED EMBODIMENTS

Figure 1:
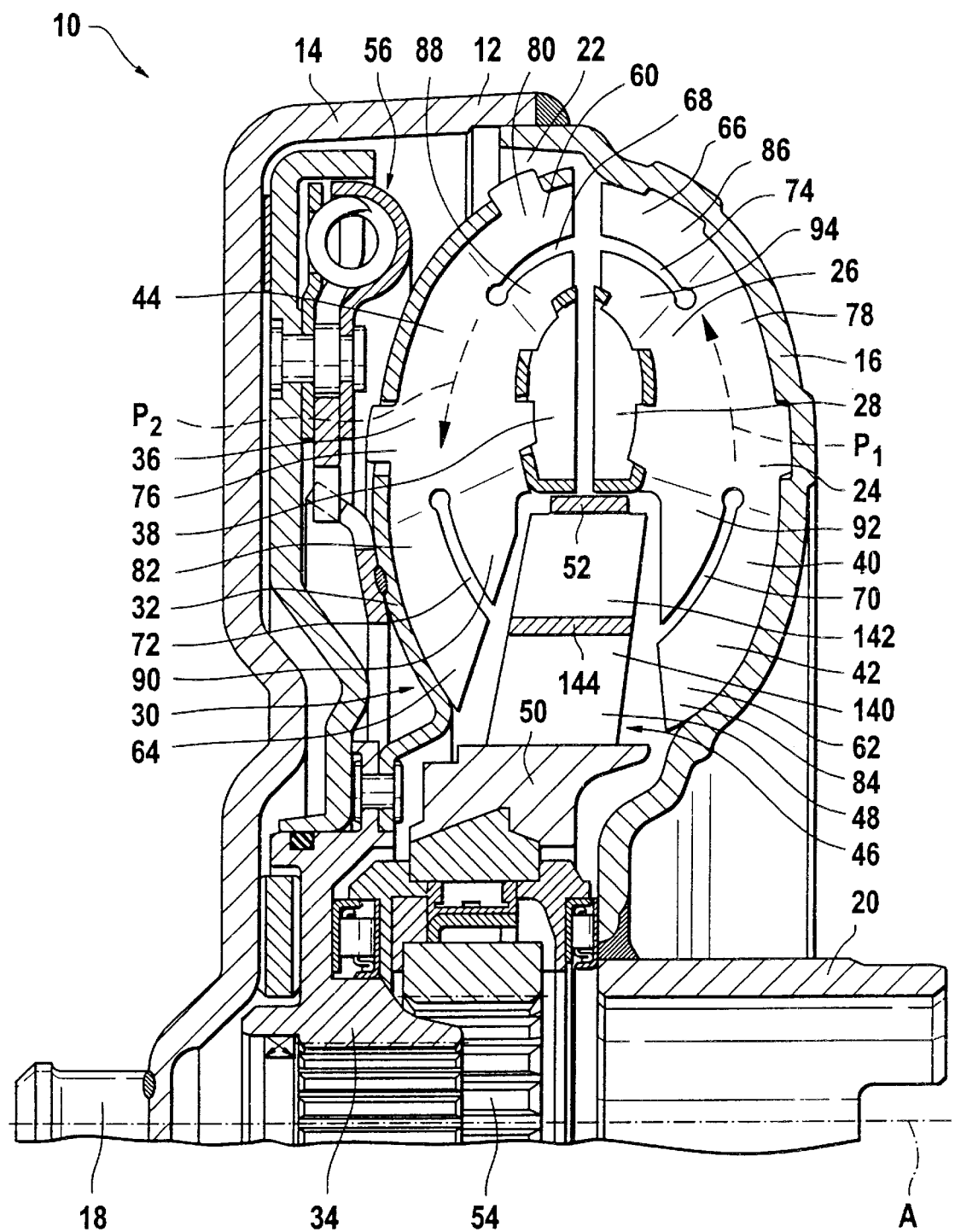
FIG. 1 is a partial longitudinal section through a hydrodynamic torque converter comprising a turbine wheel arrangement according to an embodiment of the invention and an impeller wheel arrangement according to an embodiment of the invention.

Referring to FIG. 1, a hydrodynamic torque converter 10 has a converter housing 12 which includes a housing cover 14 and an impeller wheel outer shell 16 of an impeller wheel 40 fixedly connected to the radial outer side of the housing cover 14 by welding or other similar attachment mechanism. The radial inner side of the housing cover 14 is fixedly connected to a pilot pin 18 which is designed to be mounted in a drive shaft for centering the hydraulic torque converter 10 with the drive shaft. Further, the housing cover 14 is connected in a known manner with the drive shaft, for example, via a flex plate or the like so that the housing cover 14 is fixed with respect to rotation relative to the drive shaft. The known connection of the housing cover 14 to the drive shaft is not shown. The radial inner area of the impeller wheel outer shell 16 is fixedly connected to an impeller wheel hub 20 which drives a pump to feed working fluid into the interior 22 of the torque converter 10. A plurality of blades or impeller wheel blades 24 are carried out by the impeller wheel outer shell 16. The impeller wheel blades 24 are distributed successively along the circumferential direction and extend approximately radially. It is noted that, in general, these impeller wheel blades 24 do not extend exactly radially and are curved from a radial inner side to a radial outer side in the circumferential direction. The impeller wheel blades 24 are also fixedly connected with an impeller wheel inner shell 28 at a side 26 of the impeller wheel blades 24 remote of the impeller wheel outer shell 16 and these components together form the impeller wheel 40.

A turbine wheel 30 is also arranged in the interior 22 of the torque convener 10. The turbine wheel 30 comprises a turbine wheel outer shell 32 with a turbine wheel hub 34 connected on a radial inner side of the turbine wheel outer shell 32 so that the turbine wheel hub 34 is fixed with respect to rotation relative to the turbine wheel outer shell 32. The turbine wheel hub 34 may be connected in a manner known per se with a converter output shaft, for example a transmission input shaft, so as to be fixed with respect to rotation relative to it. A plurality of turbine wheel blades 36 are carried by the turbine wheel outer shell 32 similar to the way the impeller wheel blades 24 are carried by the impeller wheel outer shell 16. The turbine wheel blades 36 are distributed successively in the circumferential direction and, similar to the impeller wheel blades 24, extend approximately radially from a radial inner side to a radial outer side and may be slightly curved in the circumferential direction. The turbine wheel blades 36 are also connected with one another via a turbine wheel inner shell 38.

Accordingly, it will be seen that fluid flow channels 42, 44 are formed in the area of the impeller wheel 40 and in the area of the turbine wheel 30 with fluid flow channel 42 formed by successive ones of the impeller wheel blades 24, the impeller outer shell 16, and the impeller inner shell 28 and fluid flow 1, 44 being formed by successive ones of the turbine wheel blades 36, the turbine wheel outer shell 32 and the turbine wheel inner shell 38. Fluid circulates in the fluid flow channels 42, 44 in the direction shown by arrows P1 and P2. It is noted that the location of arrows P1 and P2 corresponds approximately to the central threads of flow in the respective fluid flow channels 42 and 44.

A stator wheel 46 is arranged in a known manner between the impeller wheel 40 and the turbine wheel 30 and includes a plurality of stator wheel blades 48 arranged so as to follow one another in the circumferential direction with a stator wheel hub 50 carrying these stator wheel blades 48. The stator wheel blades 48 are connected with one another by a cover ring 52 at the radial outer ends of the stator wheel blades remote from the stator wheel hub 50. The stator wheel 46 is rotatable on a support shaft or a supporting hub 54 via a freewheel arrangement. The fluid exiting from the respective fluid flow channels 44 of the turbine wheel 30 is deflected by the stator wheel 46 and conducted toward the fluid flow channels 42 of the impeller wheel 40.

The torque converter 10 also includes a lockup clutch 56 for coupling the turbine wheel outer shell 32 of the turbine wheel 30 to the converter housing 12 via a torsional vibration damper, thereby fixing the turbine wheel 30 and the converter housing with respect to relative rotation for bypassing the torque converter.

In the torque converter 10 shown in FIG. 1, the impeller wheel 40 and turbine wheel 30 both have blades 24 and 36, respectively, that are shaped so that they provide two working areas that are adapted or that can be adapted to different operating states of the torque converter. As will be discussed in further detail with reference to FIGS. 2 and 3, each impeller wheel blade 24 has notches 70, 74 in a respective upstream end area 62 and downstream end area 66 relative to the fluid flow channel 42 and each turbine wheel blade 36 has notches 68, 72 in a respective upstream end area 60 and a downstream end area 64. Each of these notches 68, 70, 72, and 74 preferably extends along or approximately along the respective central thread of fluid flow channel 42 or 44 and are limited to the respective end areas 60, 62, 64, 66. Each turbine blade 36 and impeller blade 24 includes a respective blade base area 76, 78. Accordingly, each of the impeller blades 24 is divided into an upsteam end area 62, a block base area 78, and a downstream end area 66, and each of the turbine blades 36 is divided into an upstream end area 60, a downstream end area 64 and a respective blade base area 76.

The blade base areas 76, 78 are substantially flat in that they have essentially no transactions or or steps, but rather only follow the generally familiar slightly curved blade contour. The notches 68, 70, 72, 74, divide the end areas 60, 62, 64, 66 into respective outer areas 80, 84, 82, 86 and inner areas 88, 92, 90, 94, The outer areas 80, 82, 84, 86 lie closer to the impeller outer shell 16 and turbine outer shell 32 and may be bent or may extend away from the respective blade base area 76, 78 in the circumferential direction in the respective end areas 60, 62, 64, 66 differently than the respective inner blade areas 88, 90, 92, 94 which lie closer to the impeller inner shell 28 and the turbine inner shell 38. For example, in the case of the turbine wheel 30, the outer blade areas 80 and 82 lying closer to outer shell 32 may be curved or bent forward more sharply out of the drawing plane with reference to the view in FIG. 1 than the inner blade areas 88, 90 lying closer to the inner shell 38. It is possible, for example, for the outer blade areas 80, 82 to be curved forward out of the drawing plane, while the inner blade areas 88, 90 are bent backward out of the drawing plane. The respective areas at the upstream end area 60 and at the downstream end am 64 may also be bent in different directions.

In this way, two different working areas of the respective fluid flow channels 42 and 44 are generated in the impeller wheel 40 and/of in the turbine wheel 30. Accordingly, for example, an area of the respective impeller wheel blades 24 lying closer to the impeller outer shell 16 with respect to the central thread of flow P1 may be optimized by a suitable curvature or bending of outer blade areas 84, 86 for a starting state in which the torque conversion function is particularly important. The inner areas 92, 94 of the impeller blades 24 lying closer to the impeller inner shell 28 with respect to the central thread of flow P1 may be curved or bent in an optimum manner, for example, for normal driving operation in which the converter function for increasing torque has only secondary importance. By this separation or division of the turbine blades 36 or the impeller blades 24 into two working areas, a torque converter is produced with operating characteristics which can be optimized for a larger spectrum of states. The blade base areas 76, 78 of the respective turbine wheel blades 36 and the impeller wheel blades 24 with approximately flat contour, i.e., a contour which is curved only to a familiar extent, ensure that suitable operating characteristics are also achieved by the torque converter 10 in the transitional states or other operating states.

It is noted that the construction of the blades shown in FIG. 1 need not necessarily be provided at both the impeller wheel 40 and the turbine wheel 30. It is also possible to provide only one of these wheels with the blade contouring according to the invention. Further, it is possible to adjust the blade contour at the impeller wheel 40 differently than the trade contour at the turbine wheel 30.

Figure 2:
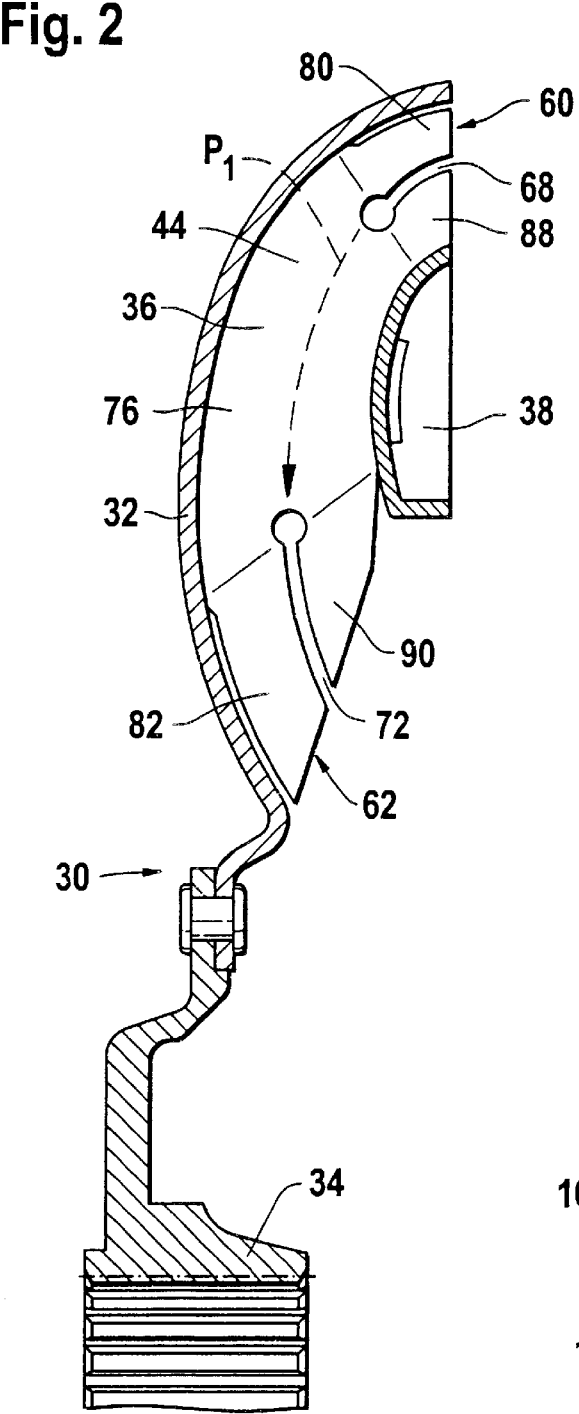
FIG. 2 is an enlarged view of the turbine wheel arrangement of FIG. 1.
Figure 3:
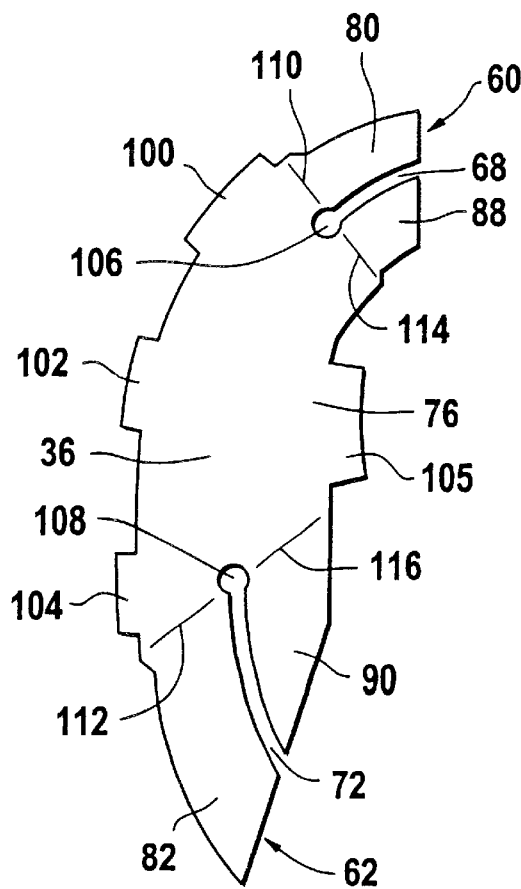
FIG. 3 shows a blade of the turbine wheel arrangement of FIG. 2.

The above-described division of the blades 26 and 36 into different working areas by different bending or curving of respective blade areas in the circumferential direction may be achieved in various ways. For example, FIGS. 2 and 3 show further details of the turbine wheel blade 36 shown in FIG. 1. This turbine wheel blade 36 is a structural component part which is stamped out of a piece of sheet metal. The portions 100, 102, 104, 105 projecting from the sides of the turbine blade are formed simultaneously during the stamping, and the turbine wheel blade 36 is connected in a known manner with the turbine inner shell 38 and the turbine outer shell 32 by these portions 100, 102, 104, 105. The outer blade areas 80, 82 and inner blade areas 88, 90 are separated by the respective slits or notches 68, 72 which are also formed simultaneously during the stamping out or cutting out process. FIG. 3 shows that the notches 68 and 72 end in relief openings or bore holes 106 and 108, respectively, to prevent forces which occur during operation from cracking the blades. Subsequent to the stamping process, the individual outer blade areas 80, 82 and inner blade areas 88, 90 are bent relative to the blade base area 76 along respective bending lines 110, 112, 114, 116. Alternatively, the individual outer blade areas 80, 82 and inner blade areas 88, 90 may proceed from the lines 110, 112, 114, 116 and be curved with respect to this blade base area 76. In this embodiment, there is no discernible bend at the bending lines 110, 112, 114, 116, only a change in curvature between the blade base area 76 and the outer blade areas 80, 82 and the inner blade areas 88, 90. As was already mentioned above, the extent of bending or curvature and the direction of bending or curvature in the circumferential direction is adapted to the desired operating characteristics in the case of every individual outer blade area 80, 82 and inner blade area 88, 90.

An alternative construction for obtaining the different blade areas which are offset relative to one another in the circumferential direction in the respective end areas of the blades is shown in FIGS. 4 to 6. FIG. 4 shows a stamped blank 120 for a turbine blade 36' with outer blade areas 80', 82' and the inner blade areas 88', 90' and the bending lines or bending areas 110', 112', 114' and 116'. Further, transitional wall areas 122 and 124 are shown separated by additional bending lines 126, 128, 130, 132 between outer and inner blade areas 80 and 88 and between outer and inner blade areas 82 and 90. After a blank 120 of the type mentioned above is stamped out, this blade 120 is inserted into a pressing or bending tool and the different blade areas 80', 82', 88', 90' arc bent along the bending lines or bending line areas 110, 112, 114, 116, 126, 128, 130, 132 shown in FIG. 4 in such a way that the shape shown in FIGS. 5 and 6 results. Accordingly, in this case also, proceeding from the blade base area 76, the individual outer blade areas 80, 82 and inner blade areas 88, 90 are shaped so as to be curved or bent away from the blade base area 76 in the circumferential direction in different ways and the transitional wall area 122 extends between blade area 80 and blade area 88. The transitional wall area 124 extends in a corresponding manner between blade area 82 and blade area 90. When a turbine wheel blade 136 of this type is positioned in a turbine wheel, the transitional wall areas 122, 124 extend approximately in the circumferential direction. As a result of a construction of this kind, in addition to the possibility of achieving different working areas in the respective turbine wheel blades 36, a stiffening of the blades and an improved flow separation of the fluid components flowing in the two working areas is achieved.

Of course, the different types of design or constructions of blades shown in FIGS. 3 to 6 can be used in the turbine wheel blades 36 as well as in the impeller wheel blades 26. Further, it is noted that it can also be advantageous, depending on the flow requirement, to provide areas which are bent in the circumferential direction as described above only in the upstream or the downstream end area of the respective blades.

It is further noted that for optimization with respect to operating characteristics, in addition to the above-described construction of the turbine wheel blades 36 and/or impeller wheel blades 24, the stator wheel blades 48 may also be divided into different flow areas. Accordingly, a radial inner (with reference to axis of rotation A) stator wheel blade portion 140 can tie contoured, for example, for a starting operation, i.e., it can have a flow-around profile which provides an optimal operating characteristic in the starting range with high torque conversion. A radial outer stator wheel blade portion 142 may be adapted to normal or driving operation, i.e., it can have a flow-around profile which provides optimum converter efficiency in this operation in which a high coupling efficiency is required. These two stator wheel blade portions 140, 142 may be separated from one another by a transitional step, by a continuous transition, or by an additional cover ring 144 such as shown in FIG. 1, so that a radial inner and radial outer working area of the stator wheel blades is produced in this se. In particular, when the cover ring 144 is provided, the radial inner stator wheel blade portions 140 can also be designed completely independent from the radial outer stator wheel blade portions 142 with respect to quantity and positioning in the circumferential direction.

Further, it is noted that the turbine wheel 30 as well as the impeller wheel 40 and the stator wheel can have a construction having one or more steps. For example, two notches can be formed one beside the other in the respective end areas of the turbine wheel blades or stator wheel blades 36, 24, so that there are three different portions of the blades which can be curved or bent in the end area in question. A corresponding construction with more than two steps is also possible in the area of the stator wheel blades. In this case, one of the blade areas which are located beside one another in the lateral direction is then referred to as an area lying closer to the outer shell or an area lying closer to the inner shell, respectively.

The invention is not limited by the embodiment described above which are presented as examples only but can be modified in various ways within the scope of protection defined by the appended patent claims.

We claim:

1. A turbine wheel arrangement for a hydraulic torque converter, comprising:

an outer shell connected with a turbine wheel hub for rotation about an axis of rotation;

a plurality of blades arranged successively along a circumferential direction on said outer shell;

an inner shell connected to said plural blades on a side of said plural blades remote from said outer shell, wherein said inner shell, said outer shell, and said plural blades form fluid channels between adjacent ones of said plural blades; and at least one of said plural blades comprising an outer blade area and an inner blade area, said outer blade area lying close to said outer shell having a shape adapted for a first operating state of the hydrodynamic torque converter and said inner blade area lying closer to said inner shell and having a shape adapted for a second operating state of the hydrodynamic torque converter.

2. The arrangement of claim 1, wherein said at least one blade further comprises a substantially flat blade base area and a blade end area abutting said blade base area at one of an upstream end and a downstream end of said blade base area, said inner blade area and said outer base area being arranged in said blade end area.

3. The arrangement according to claim 2, wherein said outer blade area extends from said blade base area in a first circumferential direction and said inner blade area extends from said blade base area in a second circumferential direction opposing said first circumferential direction so that said outer blade area is offset relative to said inner blade area.

4. The arrangement of claim 2, wherein said outer blade area and said inner blade area, extend from said blade base area along a circumferential direction from said blade base area to different degrees so that said outer blade area is offset from said inner blade area along said circumferential direction.

5. The arrangement of claim 2, wherein said outer blade area and said inner blade area extend from said blade base area toward the same circumferential direction, and said outer blade area extends at one of a different inclination and a different curvature than said inner blade area so that said outer blade area is offset from said inner blade area in the circumferential direction.

6. The arrangement of claim 5, wherein said outer blade area and inner blade area extend away from said blade base area in opposing circumferential directions.

7. The arrangement of claim 2, wherein said at least one blade comprises a notch extending along a direction of said fluid channel separating said outer blade area and said inner blade area.

8. The arrangement of claim 2, wherein said at tent one blade comprises a transitional wall area separating said outer blade area and said inner blade area.

9. The arrangement of claim 1, wherein said first operating state comprises a starting operating state of the hydrodynamic torque converter and said second operating state comprises a steady-state driving operating state of the hydrodynamic torque converter.

10. An impeller wheel arrangement for a hydrodynamic torque converter, comprising:

an outer shell connected with a impeller wheel hub for rotation about an axis of rotation;

a plurality of blades arranged successively along a circumferential direction on said outer shell;

an inner shell connected to said plural blades on a side of said plural blades remote from said outer shell, wherein said inner shell, said outer shell, and said plural blades from fluid channels between adjacent ones of said plural blades; and at least one of said plural blades comprising an outer blade area and an inner blade area, said outer blade area lying closer to said outer shell and having a shape adapted for a first operating state of the hydrodynamic torque converter and said inner blade area lying closer to said inner shell and having a shape adapted for a second operating state of the hydrodynamic torque converter.

11. The arrangement of claim 10, wherein said at least one blade further comprises a substantially flat blade base area and a blade end area abutting said blade base area at one of an upstream end and a downstream end of said blade base area, said inner blade area and said cutter base area being arranged in said blade end area.

12. The arrangement according to claim 11, wherein said outer blade area extends from said blade base area in a first circumferential direction and said inner blade area extends from said blade base area in a second circumferential direction opposing said first circumferential direction so that said outer blade area is offset relative to said inner blade area.

13. The arrangement of claim 11, wherein said outer blade area and said inner blade area extend from said blade base area along a circumferential direction from said blade base area to different degrees so that said outer blade area is offset from said inner blade area alone, said circumferential direction.

14. The arrangement of claim 11, wherein said outer blade area and said inner blade area extend from said blade base area toward the same circumferential direction, and said outer blade area extends at one of a different inclination and a different curvature than said inner blade area so that said outer blade area is offset from said inner blade area in the circumferential direction.

15. The arrangement of claim 14, wherein said outer blade area and inner blade area extend away from said blade base area in opposing circumferential directions.

16. The arrangement of claim 11, wherein said at least one blade comprises a notch extending along a direction of said fluid channel separating said outer blade area and said inner blade area.

17. The arrangement of claim 11, wherein said at least one blade comprises a transitional wall area separating said outer blade area and said inner blade area.

18. The arrangement of claim 11, wherein said first operating state comprises a said operating state of the hydrodynamic torque convener and said second operating state comprises a steady-state driving operating state of the hydrodynamic torque converter.

19. A hydrodynamic torque converter comprising an impeller wheel and a turbine wheel mounted for rotation about an axis of rotation, wherein one of said impeller wheel and said turbine wheel comprises an arrangement including:

an outer shell connected with one of an impeller wheel hub and a turbine wheel hub for rotation about an axis of rotation;

a plurality of blades arranged successively along a circumferential direction on said outer shell;

an inner shell connected to said plural blades on a side of said plural blades remote from said outer shell, wherein said inner shell, said outer shell, and said plural blades from fluid channels between adjacent ones of said plural blades; and at least one of said plural blades comprises an outer blade area and an inner blade are arranged between said outer shell and said inner shell, said outer blade area lying closer to said outer shell and having a shape adapted for a first operating state of the hydrodynamic torque converter and said inner blade area lying closer to said inner shell and having a shape adapted for a second operating state of the hydrodynamic torque converter.

20. The arrangement of claim 19, wherein said first operating state comprises a starting operating state of the hydrodynamic torque converter and said second operating state comprises a steady-state driving operating state of the hydraulic torque converter.

* * * * *